US012743717B2

(12) United States Patent
Scheibelhut et al.

(10) Patent No.: US 12,743,717 B2
(45) Date of Patent: Sep. 22, 2026

(54) USING TRAINED MACHINE-LEARNING MODEL OF AN ONLINE SYSTEM TO PREDICT TIMING OF STATE CHANGE OF VARIABLE STATE ITEM

(71) Applicant: Maplebear Inc., San Francisco, CA (US)

(72) Inventors: Brent Scheibelhut, Toronto (CA); Sara Starck, Arlington, VA (US); Clyde Simmons Manuel, Northfield, OH (US); Brandon Sim, Chicago, IL (US); Karen Kraemer Lowe, Los Altos, CA (US); Erica Jazayeri Quintana, San Francisco, CA (US); Justin Kuo-Ting Tsung, San Francisco, CA (US); Richard Lam, Long Island City, NY (US)

(73) Assignee: Maplebear Inc., San Francisco, CA (US)

( * ) Notice: Subject to any disclaimer, the term of this patent is extended or adjusted under 35 U.S.C. 154(b) by 128 days.

(21) Appl. No.: 18/940,749

(22) Filed: Nov. 7, 2024

(65) Prior Publication Data

US 2026/0127648 A1 May 7, 2026

(51) Int. Cl.
*G06Q 30/00* (2023.01)
*G06Q 30/0601* (2023.01)

(52) U.S. Cl.
CPC ..... *G06Q 30/0607* (2013.01); *G06Q 30/0641* (2013.01)

(58) Field of Classification Search
CPC ..................................................... G06Q 30/07
See application file for complete search history.

(56) References Cited

U.S. PATENT DOCUMENTS

| | | | | |
|---|---|---|---|---|
| 2019/0147396 | A1* | 5/2019 | Bohling | G06N 5/04 705/28 |
| 2020/0250531 | A1* | 8/2020 | Rai | G06N 3/0442 |
| 2021/0103934 | A1* | 4/2021 | Ha | G06Q 10/087 |
| 2022/0327685 | A1* | 10/2022 | Rogers | G06T 7/0004 |

(Continued)

OTHER PUBLICATIONS

Dutta, Gourab. “To Implement an IoT-Based Real-Time Intelligent Delivery Service Model That Enhances the Freshness, Quality, and Safety of Perishable Food Items From Preparation to Final Delivery.” International Journal of Applied Mathematics 38.8s (2025): 1770-1786.*

*Primary Examiner* — Kathleen Palavecino
(74) *Attorney, Agent, or Firm* — Fenwick & West LLP

(57) ABSTRACT

An online system uses a trained machine-learning model to predict timing of a state change of a variable state item in an order. The online system applies a trained machine-learning model to information about the variable state item and information about an ambient condition when servicing the order to predict a timing when a state of the variable state item changes from an original state at a location of a source associated with the online system to a different state. Based on the predicted timing, the online system generates a control signal that initiates at least one of a first action associated with the order or a second action associated with the variable state item. The online system performs, using the control signal, at least one of the first action associated with the order or the second action associated with the variable state item.

20 Claims, 5 Drawing Sheets

(56) References Cited

U.S. PATENT DOCUMENTS

| | | | | |
|---|---|---|---|---|
| 2023/0011553 | A1* | 1/2023 | Jhunjhunwala | G06V 20/68 |
| 2024/0095606 | A1* | 3/2024 | Kedia | G06T 7/0004 |
| 2024/0394787 | A1* | 11/2024 | Abo Fool | G06Q 30/0617 |

* cited by examiner

USING TRAINED MACHINE-LEARNING MODEL OF AN ONLINE SYSTEM TO PREDICT TIMING OF STATE CHANGE OF VARIABLE STATE ITEM

BACKGROUND

Online systems often face a vast amount of user complaints, appeasements, and poor experiences due to non-shelf stable items (i.e., perishable items) arriving in a poor state (e.g., melted or otherwise spoiled) due to environmental or fulfillment factors. Therefore, it is desirable to reduce the number of appeasements due to perishable items being delivered in an unacceptable state (e.g., melted ice cream). However, there is a technical problem of how to reduce, in an automatic manner and at a large scale as required by an online system, a number of occurrences of perishable items being delivered in unacceptable states. In particular, strategies for reducing occurrences of perishable items being delivered may involve first predicting the timing of the perishable items changing from an acceptable state to an unacceptable one. However, there are no satisfactory techniques for predicting this timing for different types of items under varying delivery times and conditions.

SUMMARY

Embodiments of the present disclosure are directed to using a trained machine-learning model of an online system to predict timing of a state change of a variable state item (e.g., perishable item). Based on the predicted timing of the state change of the variable state item, the online system may generate a user interface that displays servicing modifications for an online order caused by the variable state item in the online order. The servicing modifications may include an increased ranking of stable state items in the user interface, elimination of delivery slots for the order with the variable state item, and/or removing and refunding the variable state item from the order. Additionally, based on the predicted timing of the state change of the variable state item, the online system may apply some other remedial action, such as making a different batching decision for the order with the variable state item, and/or modifying the order by splitting delivery of the order into separate delivery of stable state items and the variable state item.

In accordance with one or more aspects of the disclosure, the online system receives, via a network from a device associated with a user of the online system, a signal that triggers a process of servicing an order. The online system identifies an item from the order having a state that is varying over time. The online system accesses a state change prediction machine-learning model of the online system, wherein the state change prediction machine-learning model is trained to predict a timing when a state of the item changes from an original state at a location of a source associated with the online system to a different state. The online system applies the state change prediction machine-learning model to information about an ambient condition when servicing the order and information about the item to generate the timing when the state of the item changes from the original state to the different state. The online system generates, based at least in part on the timing, a control signal that initiates at least one of a first action associated with the order or a second action associated with the item. The online system performs, using the control signal, at least one of the first action associated with the order or the second action associated with the item.

DETAILED DESCRIPTION

Figure 1:
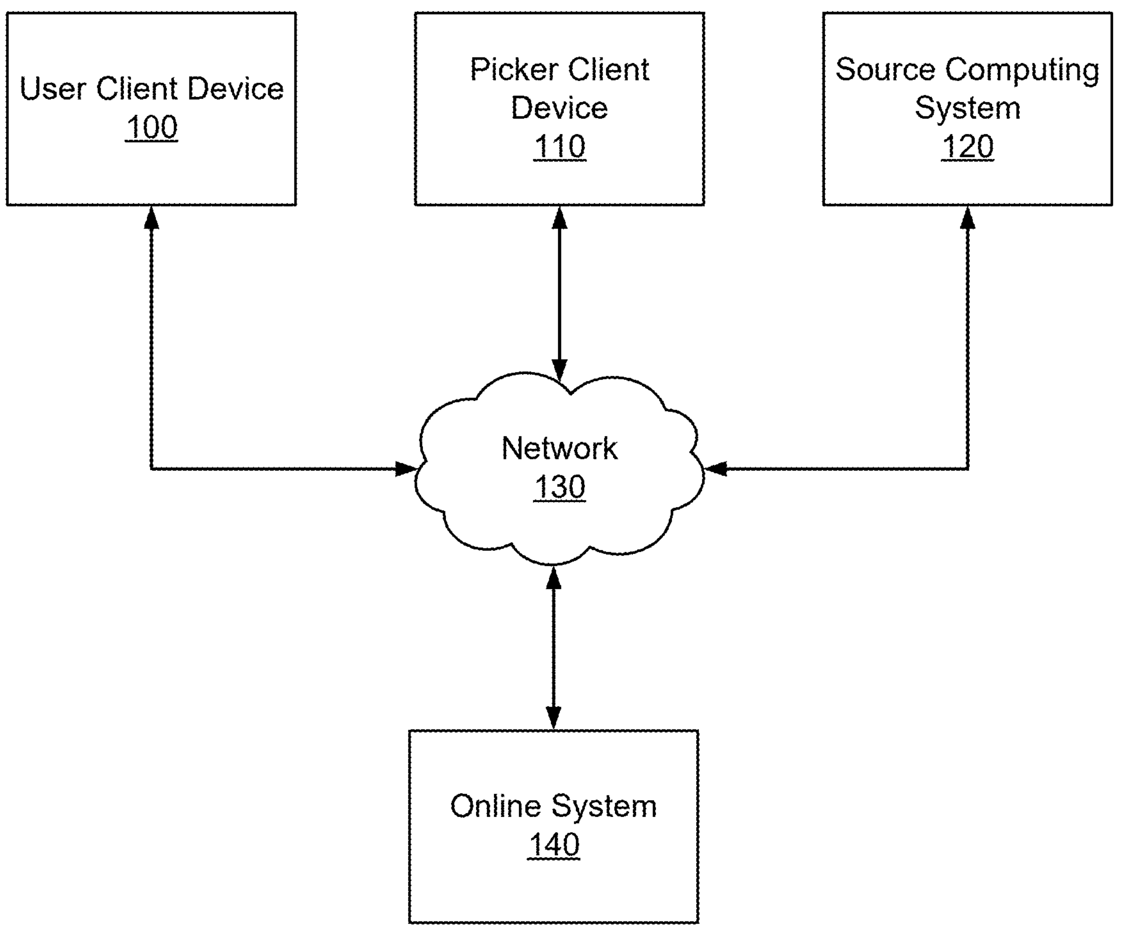
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker (i.e., fulfillment agent, servicing agent, or agent) that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a source location. The user's order may specify which groceries they want to be delivered from the source location and the quantities of each of the groceries. The user's client device 100 transmits the user's order to the online system 140 and the online system 140 selects a picker to travel to the source location to collect the groceries ordered by the user. The online system transmits an offer to the picker for the picker to service the order in exchange for consideration and, if the picker accepts the offer, the picker collects the groceries from the source location. Once the picker has collected the groceries ordered by the user, the picker delivers the groceries to a location transmitted to the picker client device 110 by the online system 140.

The online system 140 provides orders to pickers, who can accept the orders and fulfill them by obtaining the ordered items from a location of a source associated with the online system 140 and delivering the items to users of the online system 140. For items in the orders that are perishable, the online system 140 may apply a machine-learning model that is trained to predict a maximum time to deliver a perishable item before that item is delivered in an unacceptable state (e.g., melted ice cream, cold pizza, etc.). The trained machine-learning model may be applied for prediction of melting and spoilage in hot conditions, as well as for prediction of spoilage of hot items in cold conditions (e.g., pre-prepared meals). The online system 140 may then utilize the predicted maximum time for delivery to handle an order with the perishable item, such as by batching the order with other orders, prioritizing delivery of the order, enabling delivery options or different time windows for delivery of the order, ranking perishable and non-perishable items in a storefront of a user interface of the online system 140, etc.

The trained machine-learning model may utilize a variety of inputs, each of which would affect prediction of a maximum time to deliver a perishable item from an order placed at the online system 140. The order or a batch of orders may include multiple different perishable items, and, correspondingly, the trained machine-learning model may predict different maximum delivery times for different perishable items in the order or the batch of orders. In this manner, the trained machine-learning model may be leveraged apart from the fulfillment process. For example, the online system 140 may apply the trained machine-learning model to generate a user interface (e.g., at the user client device 100) where items are ranked either up in the user interface or down in the user interface based on their predicted maximum delivery times. Alternatively, the online system 140 may utilize outputs of the trained machine-learning model as additional inputs to the fulfilment process.

The online system 140 with the trained machine-learning model presented herein may leverage an approach that generates a time to deliver for each batch and subsequently alter a fulfillment algorithm (e.g., run by a trained machine-learning model) and potentially even the batch itself based on the allotted time for delivery. The online system 140 is described in further detail below with regards to FIG. 2.

Figure 2:
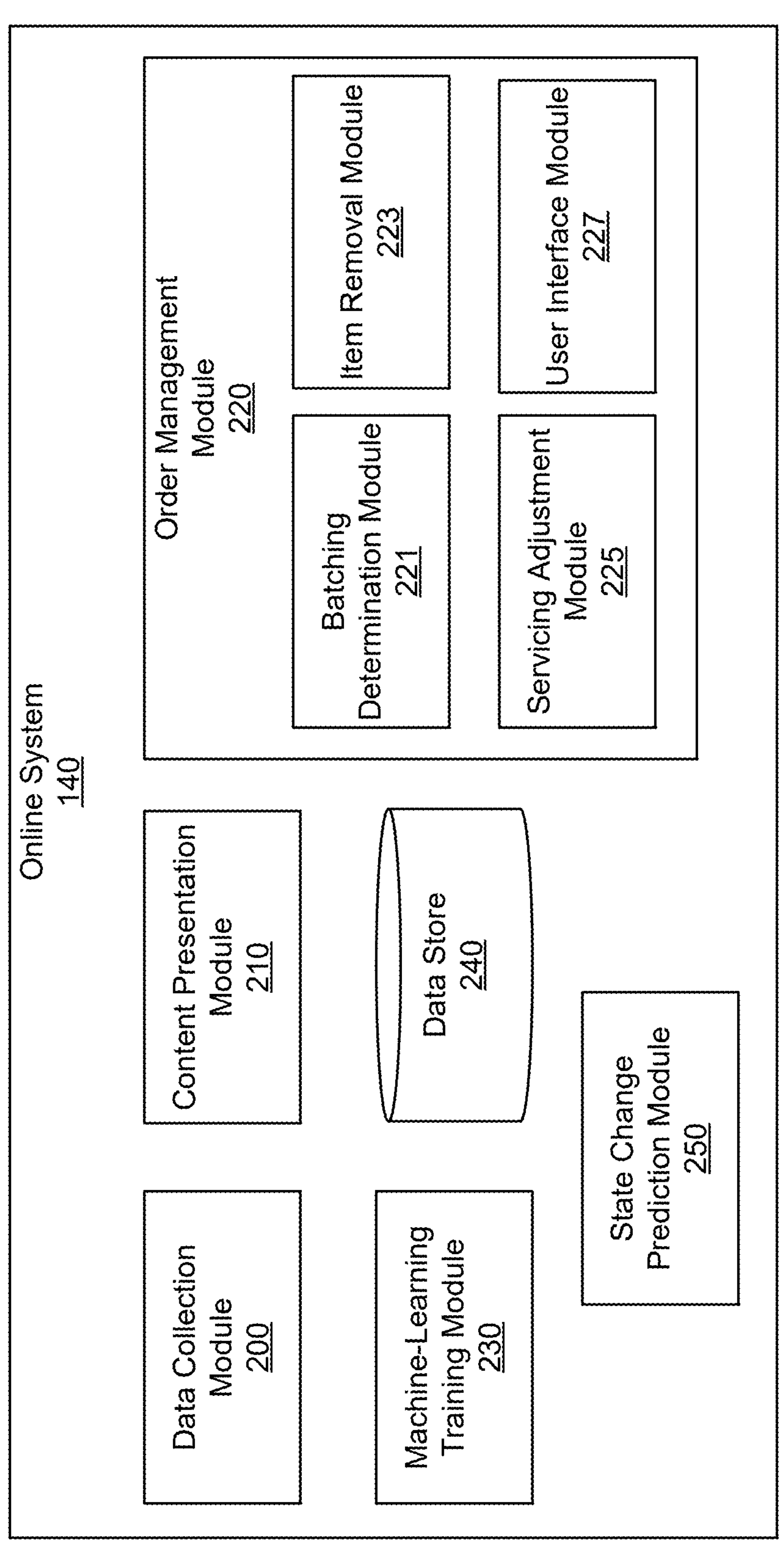
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, and a state change prediction module 250. The order management module 220 may include a batching determination module 221, an item removal module 223, a servicing adjustment module 225, and a user interface module 227. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The state change prediction module 250 may access a state change prediction model (e.g., machine-learning model) that is trained to predict a maximum time to deliver a perishable item from an order before the item is delivered in an unacceptable state. The state change prediction module 250 may deploy the state change prediction model to run a machine-learning algorithm to output, based on input signals, the maximum time to deliver the perishable item. The maximum time to deliver may represent a time period between a first time instant the perishable item has been picked in a source location and a second time instant when a state of the perishable item passes from an acceptable state to the unacceptable state. A set of parameters for the state change prediction model may be stored at one or more non-transitory computer-readable media of the state change prediction module 250. Alternatively, the set of parameters for the state change prediction model may be stored at one or more non-transitory computer-readable media of the data store 240.

The state change prediction module 250 may provide the input signals to the state change prediction model. In providing the input signals to the state change prediction model, the state change prediction module 250 may provide features of a perishable item, contextual features (e.g., temperature data), features of a picker associated with the online system 140 who is servicing an order or a batch of orders that includes the perishable item, features of a user of the online system 140 who placed the order that includes the perishable item, some other data suitable for predicting a maximum time to deliver the perishable item, or some combination thereof. Some of the input signals may be communicated from the user client device 100 or the picker client device 110 to the online system 140 and the state change prediction module 250 via the network 130. Alternatively or additionally, the state change prediction module 250 may retrieve some of the input signals from the data store 240.

In providing the features of the perishable item to the state change prediction model, the state change prediction module 250 may provide information about temperature constraints for the item, information about chemical composition of the item, some other item features suitable for predicting the maximum time to deliver the item, or some combination thereof. The information about temperature constraints may include a set of categorical temperature values, such as information at which temperature (in ° F. or ° C.) the item is at the frozen state, refrigerated state, shelf stable state, etc. Alternatively or additionally, the information about temperature constraints may include information about a time to melt given a defined ambient temperature in ° F. or ° C. The information about chemical composition of the item may include information of any content of the item that may affect the maximum time to deliver the item. For example, an ice cream composed of 25% fat will melt slower than an ice cream consisting of 5% fat. The state change prediction module 250 may retrieve the item features from an item catalog database stored at, e.g., the data store 240.

In providing the contextual features to the state change prediction model, the state change prediction module 250 may provide a current ambient temperature, an ambient temperature at an estimated time of delivery, a time of day for scheduling delivery (e.g., morning is typically cooler than in the middle of the day), historical temperature data, some other contextual features suitable for predicting the maximum time to deliver the item, or some combination thereof. Note that, for scheduling of future deliveries, it is beneficial for the state change prediction model to have information about historical temperature data along with the current weather report. The state change prediction module 250 may receive some of the contextual features (e.g., information about the current ambient temperature, information about the time of day for scheduling delivery, etc.) from the picker client device 110 via the network 130. Alternatively or additionally, the state change prediction module 250 may retrieve some of the contextual features (e.g., the historical temperature data) from a temperature database stored at, e.g., the data store 240.

In providing the features of the picker to the state change prediction model, the state change prediction module 250 may provide information about whether the picker has a trunk, cooler, or any climate-controlled method of transporting the batch (i.e., climate-controlled features of the picker), feedback data about the picker, information about whether a location of a source associated with the online system 140 has insulated bags that the picker can purchase, some other picker related data suitable for predicting the maximum time to deliver the item, or some combination thereof. The picker's climate-controlled features may include image data of a picker's trunk taken by the picker prior to picking the batch and uploaded to the online system 140 from the picker client device 110 via the network 130. The feedback data about the picker may include information about a number of temperature-related appeasements the picker managed in the past. The state change prediction module 250 may retrieve the feedback data about the picker from a picker catalog database stored at, e.g., the data store 240.

In providing the features of the user to the state change prediction model, the state change prediction module 250 may provide information about a user's delivery location (e.g., an insulated condo lobby is different than the porch of a house), information about a user's current location, some other user related data suitable for predicting the maximum time to deliver the item, or some combination thereof. The state change prediction module 250 may retrieve the information about the user's delivery location from a user catalog database stored at, e.g., the data store 240, and may include vision inputs from prior deliveries at the user's location. The state change prediction module 250 may receive information about the user's current location from the user client device 100 via the network 130.

The state change prediction model may output a maximum time to deliver an order or a batch of orders including a perishable item, which represents a maximum time to deliver the perishable item before the perishable item is delivered in an unacceptable state. Alternatively, the state change prediction model may output a maximum time to deliver an order or a batch of orders with one or more most egregious items removed. An output of the state change prediction model may be leveraged on its own and fed into various portions of an online platform of the online system 140. For example, the output of the state change prediction model may affect a user interface of the online system 140 (e.g., home screen or delivery options). Alternatively, the output of the state change prediction model may be fed into the fulfillment algorithm of the online system 140 as an additional input.

The machine-learning training module 230 may perform initial training of the state change prediction model using training data. The machine-learning training module 230 may generate the training data based on datasets collected in lab settings about food spoilage. These datasets may be also utilized for building a storage temperature catalog attribute database (e.g., stored at the data store 240) to enhance the staging process. The storage temperature catalog attributes may be also used to determine a number of temperature-controlled items in each order. Alternatively or additionally, the machine-learning training module 230 may generate the training data by isolating highly perishable items using information about previously ordered items. In such cases, machine-learning training module 230 may find concentric circles of items from previous appeasement filings to isolate the perishable items. Alternatively or additionally, the machine-learning training module 230 may generate the training data based on manual labelling of previously ordered items. The machine-learning training module 230 may train the state change prediction model using the training data to generate initial values for the set of parameters of the state change prediction model.

The machine-learning training module 230 may collect feedback data with information about appeasements related to, e.g., the perishability of the item. The appeasements may be granularized based on days of similar ambient temperatures. The machine-learning training module 230 may then re-train the state change prediction model by updating the set of parameters of the state change prediction model using the feedback data. The state change prediction model may be reinforced largely by the reduction in appeasements for a given delivery area. Alternatively or additionally, the machine-learning training module 230 may collect feedback data with information about user-to-picker feedback related to the perishability of items being delivered, which may be an indication of whether the machine-learning algorithm is succeeding in predicting maximum times to deliver perishable items. For example, negative users' comments about perishability would be negative reinforcement signals, whereas positive users' comments or no comments (i.e., no user complaints) would be positive reinforcement signals.

Based on an output of the state change prediction model, the batching determination module 221 may determine a sequence of orders to be delivered. For example, an order with a highly perishable item may be scheduled first for delivery among orders that form a batch of orders. Alternatively or additionally, based on outputs of the state change prediction model, the batching determination module 221 may adjust a batch of orders that include perishable items, e.g., by excluding some of perishable items from the orders. Alternatively or additionally, based on an output of the state change prediction model, the batching determination module 221 break an order with one or more perishable items into parts and fulfill separately, such as deliver as fast as possible a first part of the order that includes the one or more perishable items, and deliver later a second part of the order that includes only shelf-stable items.

The batching determination module 221 may cancel or auto-refund the perishable items if it is determined (e.g., based on their maximum times for delivery output by the state change prediction model) that the perishable items cannot be delivered in time (i.e., risk vs. reward). For example, if the batching determination module 221 determines that 85% of the order can be delivered safely, then the batching determination module 221 may trigger auto-refund of those non-shelf stable items. However, if the batching determination module 221 determines that less than 60% of the order can be delivered safely, then the batching determination module 221 may generate a user interface of the user client device 100 with an offer for a user of the online system 140 to select a new delivery time window. The new delivery time window may be, e.g., earlier, or later in the day when it is cooler, when there is a capable climate-controlled vehicle for delivery, or when the user is more likely to be home to reduce time spent on the porch.

In one or more embodiments, the batching determination module 221 is configured to operate as a generative Artificial Intelligence (AI) element, i.e., to generate communications for a user of the online system 140 in the right tone based on information about a perishable item, a current ambient temperature, and previous communications with the user. For example, the batching determination module 221 operating as a generative AI element may be able to communicate with the user using the right humor tone along with the temperature data and item data, such as, "It's hot outside, and given your milk is already pasty we don't want it to burn". When certain items are canceled due to temperature constraints, the batching determination module 221 may suggest shelf stable replacements such as evaporated milk or ultra-high temperature (UHT) milk that can withstand higher ambient temperatures compared to the regular milk that may be spoiled due to high ambient temperature. Also, the batching determination module 221 may suggest similar flavors but not in a form that can be spoiled, e.g., cotton candy instead of cotton candy ice cream.

The item removal module 223 may determine and remove items from an order or batch of orders that are likely to result in appeasements due to being delivered in unacceptable conditions. The item removal module 223 may access an item removal model (e.g., machine-learning model) that is trained to identify whether an item in an order should be removed. The item removal module 223 may deploy the item removal model to run a machine-learning algorithm to output, based on input signals, a removal score for each item in the order. The removal score may be a binary value (i.e., 0 or 1), where the value of 0 for the removal score means that the item should not be removed, and the value of 1 for the removal score means that the item should be removed from the order. A set of parameters for the item removal model may be stored at one or more non-transitory computer-readable media of the item removal module 223. Alternatively, the set of parameters for the item removal model may be stored at one or more non-transitory computer-readable media of the data store 240. Instead of the item removal model, the item removal module 223 may apply a heuristic rule-based algorithm (e.g., using the same input signals as the item removal model) to determine whether an item should be removed from an order.

The item removal model may be trained to decide whether to remove items that are extremely detrimental to the perishability of an order or batch of orders. The item removal model may be trained to operate as an item-specific classifier. In providing the input signals to the item removal model, the item removal module 223 may provide various item-specific features, such as temperature constraints for an item, historical appeasement data for the item, a current ambient temperature, information about picker's experience, user-specific criteria (e.g., number of prior appeasements for a user of the online system 140 in relation to the item), some other item related data, or some combination thereof. The item removal module 223 may retrieve at least some of the item-specific features from an item catalog database stored at, e.g., the data store 240.

The machine-learning training module 230 may perform initial training of the item removal model using training data. The machine-learning training module 230 may generate the training data by isolating highly perishable items using information about previously ordered items. In such cases, machine-learning training module 230 may find concentric circles of items from previous appeasement filings to isolate the perishable items. Alternatively or additionally, the machine-learning training module 230 may generate the training data based on manual labelling of previously ordered items. Additionally, the machine-learning training module 230 may generate the training data based on datasets collected in lab settings about food spoilage. These datasets may be also utilized for building a storage temperature catalog attribute database (e.g., stored at the data store 240) to enhance the staging process. The storage temperature catalog attributes may be also used to determine a number of temperature-controlled items in each order. The machine-learning training module 230 may train the item removal model using the training data to generate initial values for the set of parameters of the item removal model.

The machine-learning training module 230 may collect feedback data with information about appeasements, e.g., where the issue was about the perishability of the item. The item removal model may be reinforced largely by the reduction in appeasements for a given delivery area. The appeasements may be granularized based on days of similar ambient temperature. Alternatively or additionally, the machine-learning training module 230 may collect feedback data with information about user-to-picker feedback related to the perishability of food, which may be an indication of whether the machine-learning algorithm is succeeding is predicted a maximum time to deliver a perishable item. For example, negative users' comments about perishability would be negative reinforcement signals, whereas positive users' comments or no comments (i.e., no user complaints) would be positive reinforcement signals. The machine-learning training module 230 may then re-train the item removal model by updating the set of parameters of the item removal model using the feedback data.

The servicing adjustment module 225 may adjust servicing (i.e., packaging and fulfillment) of an order or a batch of orders with perishable items, based on outputs of the state change prediction model. The servicing adjustment module 225 may generate, based on outputs of the state change prediction model, a user interface of the picker client device 110 that displays an order of placing items in a bag (or box) that would increase the time to live of the items. For example, the servicing adjustment module 225 may suggest placing all the frozen items together in the same bag. Alternatively, the servicing adjustment module 225 may reschedule flexible deliveries (e.g., deliveries with non-specific delivery times). For example, the servicing adjustment module 225 may schedule a delivery in the morning if a number of orders have short time to live. Alternatively or additionally, the servicing adjustment module 225 may prioritize orders with the most temperature-controlled items for delivery first in the multi-batch delivery.

Alternatively or additionally, the servicing adjustment module 225 may calculate, given the reduction in appeasements, a cost-benefit of providing a certain cohort of pickers with personal coolers for their vehicles. The servicing adjustment module 225 may then trigger corresponding action messages for the online system 140 to purchase personal coolers for pickers' vehicles. Alternatively or additionally, the servicing adjustment module 225 may schedule a whole separate delivery flow for a part of the batch that cannot be delivered on time in an acceptable state. In such cases, the servicing adjustment module 225 may send, via the network 130, a request to the source computing system 120 for perishable items in the batch to wait in a cooler in a source location until there lines up a corresponding delivery.

The user interface module 227 may generate a user interface of the online system 140 based on outputs of the state change prediction model or the item removal model. In such cases, the user interface module 227 may alter the user interface in a variety of ways. Based on outputs of the state change prediction model or the item removal model, the user interface module 227 may determine an order in which items are displayed at a user interface of the picker client device 110. For example, the user interface module 227 may generate the user interface of the picker client device 110 with frozen items displayed last so that the picker would pick the frozen items last.

In one or more embodiments, the user interface module 227 increases ranking of shelf-stable items when an ambient temperature is above a threshold temperature. In such cases, the user interface module 227 may generate a user interface of the user client device 100 with items that are shelf stable displayed before items that are not during hot ambient conditions. For example, the ice cream would not feature prominently at the user interface of the user client device 100 if the ambient temperature is above a threshold temperature (e.g., 100° F.). Alternatively, the user interface module 227 may generate the user interface of the user client device 100 that features more shelf stable items when the ambient temperature is above the threshold temperature.

In one or more other embodiments, the user interface module 227 generates an adjusted user interface of the user client device 100 with delivery time slots for orders with perishable items being eliminated for certain periods of time (e.g., no delivery in the middle of hot day). If the user has not selected a delivery time yet, the user interface module 227 may predict likely delivery times based on past delivery times associated with the user and eliminate some of the predicted delivery times based on the perishability of items in the user's cart. The user interface module 227 may adjust the available delivery zones or delivery times shown at the user interface of the user client device 100 based on the perishability of items in the user's cart. For example, the user interface module 227 may adjust the interface to not show certain delivery times during midday depending on the items in the user's cart as the items are ready for the checkout. Alternatively or additionally, if certain climate-controlled delivery drop-off locations are associated with the online system 140, the user interface module 227 may generate a user interface of the user client device where an option for delivery to the climate-controlled delivery drop-off locations is more prominently displayed as an option for checkout.

Figure 3:
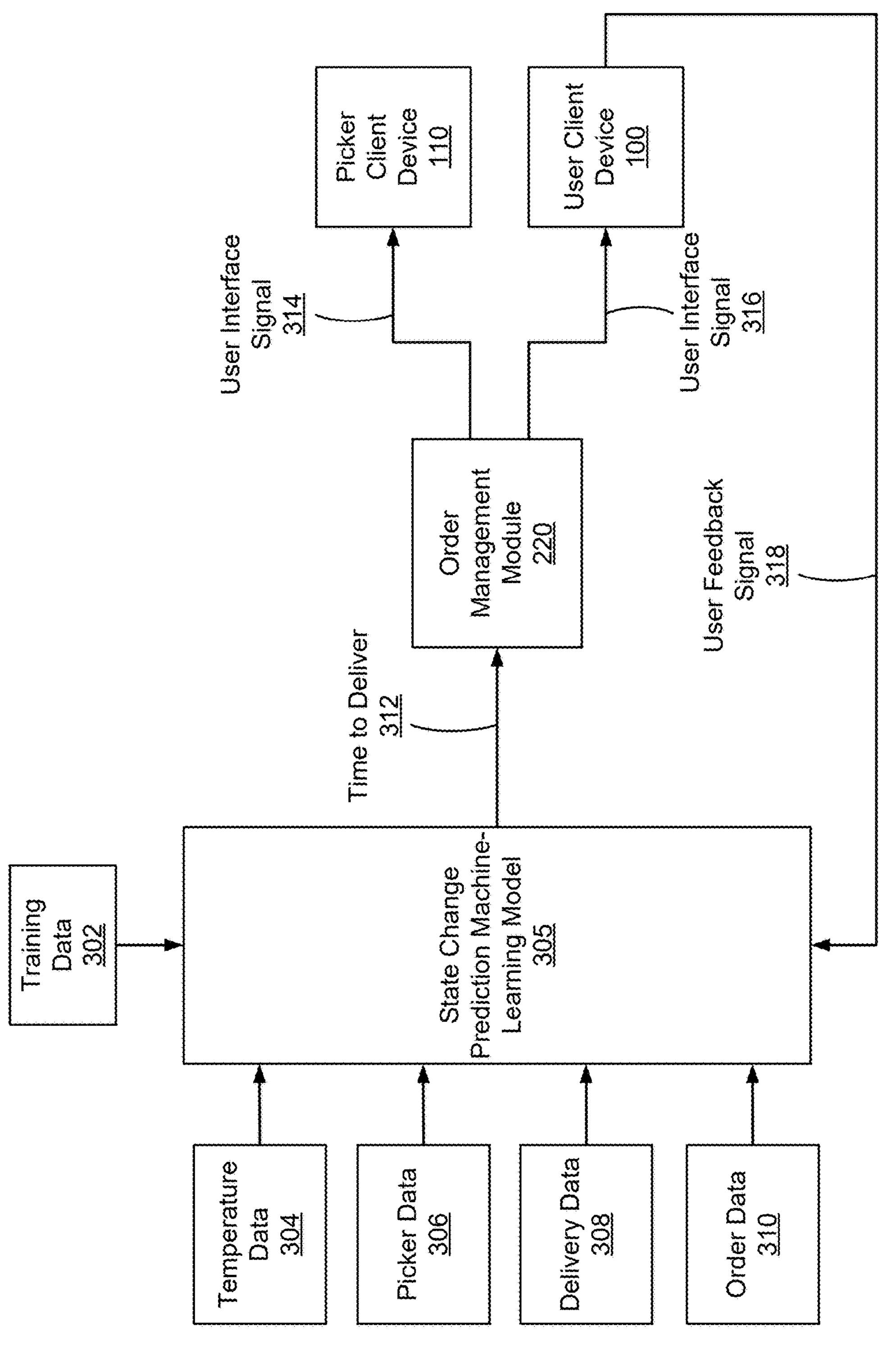
FIG. 3 illustrates an example architectural flow diagram of using a trained machine-learning model of an online system to predict timing of a state change of a perishable item in an order, in accordance with one or more embodiments.

FIG. 3 illustrates an example architectural flow diagram 300 of using a state change prediction machine-learning model 305 of the online system 140 to predict timing of a state change of a perishable item in an order, in accordance with one or more embodiments. Prior to running a machine-learning algorithm of the state change prediction machine-learning model 305, the online system 140 may perform (e.g., via the machine-learning training module 230) initial training of the state change prediction machine-learning model 305 using training data 302 to generate initial values for a set of parameters of the state change prediction machine-learning model 305. The training data 302 may be generated (e.g., via the machine-learning training module 230) based on datasets collected in lab settings about food spoilage, by isolating highly perishable items using information about previously ordered items, based on manual labels of previously ordered items, etc. After the training process is completed, the online system 140 may provide a set of inputs to the state change prediction machine-learning model 305 (e.g., via the state change prediction module 250), such as temperature data 304, picker data 306, delivery data 308, or order data 310. Some additional inputs not shown in FIG. 3 suitable for identifying a maximum time to deliver an item before the item is delivered in an unacceptable state may be further provided to the state change prediction machine-learning model 305.

In providing the set of inputs to the state change prediction machine-learning model 305, the state change prediction module 250 may provide the temperature data 304 with information about temperature constraints for an item (e.g., temperatures (in ° F. or ° C.) the item is at frozen state, refrigerated state, shelf stable state, etc.), information about a time to melt for the item given a defined ambient temperature in ° F. or ° C., a current ambient temperature, an ambient temperature at an estimated time of delivery, historical temperature data, some other temperature related data, or some combination thereof. The state change prediction module 250 may retrieve at least some of the temperature data 304 from a temperature catalog database stored at, e.g., the data store 240. Additionally, the state change prediction module 250 may receive some of the temperature data 304 in real time, e.g., from the picker client device 110 via the network 130.

In providing the set of inputs to the state change prediction machine-learning model 305, the state change prediction module 250 may further provide the picker data 306 with information about a picker associated with the online system 140 who is servicing the order or batch of orders, such as information about whether the picker has a trunk, cooler, or any climate-controlled method of transporting the batch (i.e., information about climate-controlled features of the picker), information about whether a location of a source associated with the online system 140 has insulated bags that the picker can purchase, information about a number of temperature-related appeasements the picker had in the past, some other picker related data, or some combination thereof. The state change prediction module 250 may retrieve at least some of the picker data 306 from a picker catalog database stored at, e.g., the data store 240. Additionally, the state change prediction module 250 may receive some of the picker data 306 in real time, e.g., from the picker client device 110 via the network 130.

In providing the set of inputs to the state change prediction machine-learning model 305, the state change prediction module 250 may further provide the delivery data 308 with information about a user's delivery location (e.g., an address, pictures of the user's delivery location obtained from past deliveries, etc.), a time of delivery, some other delivery related data, or some combination thereof. The state change prediction module 250 may retrieve information about the user's delivery location from a user catalog database stored at, e.g., the data store 240. Additionally, the state change prediction module 250 may receive information about the time of delivery from the picker client device 110 or the user client device 100 via the network 130.

In providing the set of inputs to the state change prediction machine-learning model 305, the state change prediction module 250 may further provide the order data 310 with information about the current batch, such as information on whether the batch is a multi-order batch that needs to be delivered to different locations. The state change prediction module 250 may receive the order data 310 from the picker client device 110 via the network 130.

The state change prediction machine-learning model 305 may apply the machine-learning algorithm to the temperature data 304, the picker data 306, the delivery data 308, or the order data 310 to predict a time to deliver 312 a perishable item from the order or batch of orders. The time to deliver 312 represents a maximum time period between a first time instant the perishable item has been picked in a source location and a second time instant when a state of the perishable item passes from an acceptable state to the unacceptable state. The state change prediction machine-learning model 305 may pass information about the time to deliver 312 to the order management module 220.

Based on information about the time to deliver 312 the perishable item from the order or batch of orders, the order management module 220 may generate (e.g., via the user interface module 227) a user interface signal 314 or a user interface signal 316. The order management module 220 may communicate, via the network 130, the user interface signal 314 to picker client device 110. Alternatively or additionally, the order management module 220 may communicate, via the network 130, the user interface signal 316 to the user client device 100 associated with a user of the online system 140 who ordered the perishable item.

Based on the user interface signal 314, an appropriate user interface may be generated at the picker client device 110. In one or more embodiments, the user interface signal 314 generates the user interface of the picker client device 110 with an adjusted sequence of orders from the batch of orders for delivery. In such cases, the user interface of the picker client device 110 may show an order having a temperature-controlled item being prioritized for delivery. In one or more other embodiments, based on the time to deliver 312, the order management module 220 may break an order with the perishable item into two parts that would be serviced separately, such that a part of the order with the perishable item would be delivered first. In such cases, the user interface signal 314 may generate a user interface of the picker client device 110 that displays division of the order with the perishable item into multiple sub-orders and a notification for the picker to service a sub-order with the perishable item first.

In one or more other embodiments, based on the time to deliver 312, the order management module 220 may cancel or auto-refund the perishable item if it is determined that the perishable item cannot be delivered in time before being spoiled. In such cases, the user interface signal 314 may generate a user interface of the picker client device 110 showing that the perishable item is canceled from the order and that the appropriate refund should be provided to the user. In one or more other embodiments, the user interface signal 314 may generate a user interface of the picker client device 110 that displays an order of placing items in a bag (or box) that would increase the time to live of the perishable items.

Similarly, based on the user interface signal 316, an appropriate user interface may be generated at the user client device 100. In one or more embodiments, the user interface signal 316 may generate a user interface of the user client device 100 that displays an offer for the user to select a new delivery time window. In one or more other embodiments, based on the time to deliver 312, the order management module 220 may reschedule a delivery for the order with the perishable item (e.g., reschedule for morning or evening hours). In such cases, the user interface signal 316 may generate a user interface of the user client device 100 that displays a notification about the rescheduled delivery for the order with the perishable item.

In one or more other embodiments, the user interface signal 316 generates a user interface of the user client device 100 with an adjusted ranking of displayed items (e.g., during hot conditions), i.e., shelf stable items are displayed at the user interface before any perishable item. In one or more other embodiments, the user interface signal 316 generates a user interface of the user client device 100 that displays adjusted available delivery zones or adjusted delivery times (e.g., based on the perishability of one or more items in the user's cart). In one or more other embodiments, based on the time to deliver 312, the order management module 220 may cancel or auto-refund the perishable item if it is determined that the perishable item cannot be delivered in time before being spoiled. In such cases, the user interface signal 316 may generate a user interface of the user client device 100 showing that the perishable item is canceled from the order and that the appropriate refund is provided to the user.

The user who ordered the perishable item may record, via the user client device 100, a user feedback signal 318 with information about user's satisfaction about a state of the perishable item at which the perishable item was delivered to the user. For example, a negative user's comment about the delivery state of the perishable item may represent a negative user feedback signal 318, whereas a positive user's comment about the delivery state of the perishable item may represent a positive user feedback signal 318. The online system 140 may receive (e.g., via the machine-learning training module 230) the user feedback signal 318 from the user client device 100 via the network 130. The machine-learning training module 230 may utilize the user feedback signal 318 to re-train the state change prediction machine-learning model 305. By utilizing user feedback signals 318 provided by various users of the online system 140, the machine-learning training module 230 may continuously update the set of parameters of the state change prediction machine-learning model 305 and continuously improve the machine-learning algorithm of the state change prediction machine-learning model 305.

Figure 4:
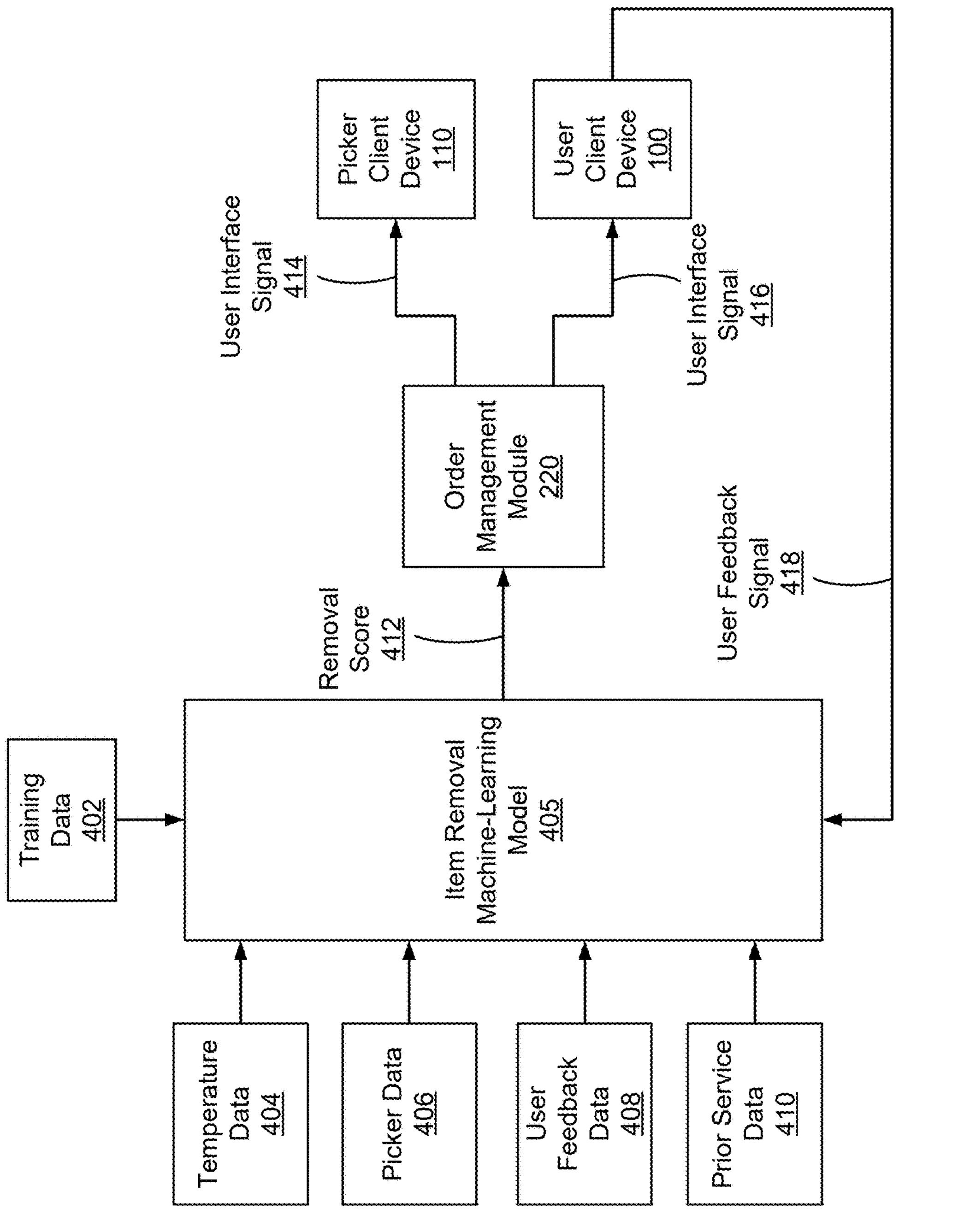
FIG. 4 illustrates an example architectural flow diagram of using a trained machine-learning model of an online system to determine whether to remove an item from an order that can be detrimental to a state of the order when the order is delivered, in accordance with one or more embodiments.

FIG. 4 illustrates an example architectural flow diagram 400 of using an item removal machine-learning model 405 of the online system 140 to determine whether to remove an item from an order that can be detrimental to a state of the order when the order is delivered, in accordance with one or more embodiments. Prior to running a machine-learning algorithm of the item removal machine-learning model 405, the online system 140 may perform (e.g., via the machine-learning training module 230) initial training of the item removal machine-learning model 405 using training data 402 to generate initial values for a set of parameters of the item removal machine-learning model 405. The training data 402 may be generated (e.g., via the machine-learning training module 230) by isolating highly perishable items using information about previously ordered items, based on manual labels of previously ordered items, based in datasets collected in lab settings about food spoilage, etc. After the training process is completed, the online system 140 may provide a set of inputs to the item removal machine-learning model 405 (e.g., via the item removal module 223), such as temperature data 404, picker data 406, user feedback data 408, or prior service data 410. Some additional inputs not shown in FIG. 4 suitable for determining whether to remove the item from the order may be further provided to the item removal machine-learning model 405.

In providing the set of inputs to the item removal machine-learning model 405, the item removal module 223 may provide the temperature data 404 with information about temperature constraints for an item (e.g., temperatures (in ° F. or ° C.) the item is at frozen state, refrigerated state, shelf stable state, etc.), information about a time to melt for the item given a defined ambient temperature in ° F. or ° C., a current ambient temperature, an ambient temperature at an estimated time of delivery, historical temperature data, some other temperature related data, or some combination thereof. The item removal module 223 may retrieve at least some of the temperature data 404 from a temperature catalog database stored at, e.g., the data store 240. Additionally, the item removal module 223 may receive some of the temperature data 404 in real time, e.g., from the picker client device 110 via the network 130.

In providing the set of inputs to the item removal machine-learning model 405, the item removal module 223 may further provide the picker data 406 with information about a picker associated with the online system 140 who is servicing the order or batch of orders, such as information about whether the picker has a trunk, cooler, or any climate-controlled method of transporting the batch (i.e., information about climate-controlled features of the picker), information about whether a location of a source associated with the online system 140 has insulated bags that the picker can purchase, information about a number of temperature-related appeasements the picker had in the past, some other picker related data, or some combination thereof. The item removal module 223 may retrieve at least some of the picker data 406 from a picker catalog database stored at, e.g., the data store 240. Additionally, the item removal module 223 may receive some of the picker data 406 in real time, e.g., from the picker client device 110 via the network 130.

In providing the set of inputs to the item removal machine-learning model 405, the item removal module 223 may further provide the user feedback data 408 with information about user-specific criteria, such as a number of prior appeasements by the user in relation to an item being evaluated for removal, details about the prior appeasements, some other user related data, or some combination thereof. The item removal module 223 may retrieve the user feedback data 408 from a user catalog database stored at, e.g., the data store 240. Additionally or alternatively, the item removal module 223 may receive some of the user feedback data 408 in real time from the user client device 100 via the network 130.

In providing the set of inputs to the item removal machine-learning model 405, the item removal module 223 may further provide the prior service data 410 with information about historical appeasements in relation to the item being evaluated for removal. The item removal module 223 may retrieve the prior service data 410 from an item catalog database stored at, e.g., the data store 240.

The item removal machine-learning model 405 may apply the machine-learning algorithm to the temperature data 404, the picker data 406, the user feedback data 408, or the prior service data 410 to output a removal score 412 for the item. The removal score 412 may be a binary value (i.e., 0 or 1), where the value of 0 for the removal score 412 means that the item should not be removed from an order or batch of orders; and the value of 1 for the removal score 412 means that the item should be removed from the order or batch of orders because the item cannot be delivered before being converted into an unacceptable state. The item removal machine-learning model 405 may pass the removal score 412 to the order management module 220.

Based on the removal score 412 for the item, the order management module 220 may generate (e.g., via the user interface module 227) a user interface signal 414 or a user interface signal 416. The order management module 220 may communicate, via the network 130, the user interface signal 414 to picker client device 110. Alternatively or additionally, the order management module 220 may communicate, via the network 130, the user interface signal 416 to the user client device 100 associated with a user of the online system 140 who ordered the item that is being removed from the order or batch of orders.

Based on the user interface signal 414, an appropriate user interface may be generated at the picker client device 110.

Based on the removal score 412, the item removal module 223 may remove (i.e., cancel) the item from the order or batch of orders. In such cases, the user interface signal 414 may generate a user interface of the picker client device 110 showing that the item is canceled from the order and that the appropriate refund should be provided to the user.

Similarly, based on the user interface signal 416, an appropriate user interface may be generated at the user client device 100. Based on the removal score 412, the order management module 220 may cancel or auto-refund the item. In such cases, the user interface signal 416 may generate a user interface of the user client device 100 showing that the item was removed from the order, a message with an explanation about why the item was canceled from the order, and that the appropriate refund is provided to the user. Alternatively, based on the removal score 412, the order management module 220 may remove the item from a current batch of orders, but reschedule delivery of the item for some other time window (e.g., for time of day when ambient conditions are more favorable). In such cases, the user interface signal 416 may generate a user interface of the user client device 100 showing that the item was removed from one batch of orders and will be delivered in a rescheduled time window.

The user who ordered the item may record, via the user client device 100, a user feedback signal 418 with information about user's satisfaction about delivery of the order without the item, or delivery of the item in the rescheduled time window. For example, a negative user's comment about delivery of the order without the item may represent a negative user feedback signal 418, whereas a positive user's comment about a state of the item that was delivered in the rescheduled time window may represent a positive user feedback signal 418. The online system 140 may receive (e.g., via the machine-learning training module 230) the user feedback signal 418 from the user client device 100 via the network 130. The machine-learning training module 230 may utilize the user feedback signal 418 to re-train the item removal machine-learning model 405. By utilizing user feedback signals 418 provided by various users of the online system 140, the machine-learning training module 230 may continuously update the set of parameters of the item removal machine-learning model 405 and continuously improve the machine-learning algorithm of the item removal machine-learning model 405.

In one or more embodiments, a Temperature Spoilage Prediction (TSP) machine-learning model is implemented at the online system 140 to address challenges associated with reducing temperature-related spoilage of perishable goods during delivery. Source platforms may encounter difficulties in managing temperature-sensitive items such as meats, dairy products, fresh produce, and seafood, especially in regions subject to high temperatures. Conventional methods might not fully utilize available data, necessitating a more advanced, data-driven solution.

In some embodiments, the online system 140 employs the TSP machine-learning model to predict spoilage likelihood. The TSP machine-learning model can be built upon extensive historical order data from a comprehensive database, assigning each order a spoilage likelihood score in the range from 0 to 1. Inputs considered by the TSP machine-learning model can include item-specific metrics such as the quantities of dairy, frozen foods, and other temperature-sensitive products, alongside order characteristics such as gross merchandise volume (GMV) and user demographics, including user tenure and historical service experiences. Source-specific data may further contextualize the TSP machine-learning model by accounting for variances in operational performance.

Furthermore, these embodiments may integrate environmental data, notably zone temperature forecasts from external meteorological services. By consolidating these data sets, orders can be prioritized by their predicted spoilage likelihood and environmental conditions, optimizing logistics to mitigate spoilage potential.

In one or more embodiments, operational decisions are guided by a calculated spoilage likelihood score. To effectively manage and predict the risk of temperature spoilage for perishable items, a robust TSP machine-learning model is designed. The TSP machine-learning model may employ a multifaceted approach by analyzing various inputs that significantly influence the likelihood of spoilage during transit. By integrating data from diverse sources, such as order components, user characteristics, and source performance, the TSP machine-learning model generates a comprehensive spoilage likelihood score for each order.

The combination of the spoilage likelihood score with environmental factors, specifically zone temperature forecasts, guides the application of optimization rules. These rules are delineated to enhance logistical decision-making, ensuring perishable items maintain their quality throughout the delivery process. Specific inputs to the TSP machine-learning model are detailed below, followed by the temperature optimization rules table (Table 1) that may govern logistic adjustments based on the spoilage scores calculated by the TSP machine-learning model.

The inputs to the TSP machine-learning model may include order components data, order characteristics data, user characteristics data, and source characteristics data. The order components data may include a dairy item quantity, fresh produce item quantity, frozen food item quantity, seafood quantity, deli item quantity, meat item quantity, meat alternatives item quantity, baked good item quantity, pantry item quantity, ready-to-cook meals quantity, some other order components data, or some combination thereof. The order characteristics data may include a GMV of an order and/or an initial tip for the order (e.g., as a percentage of the GMV). The user characteristics data may include information about user's tenure with the online system 140, user's past experiences/appeasement history, user's location/distance from a source location, some other user related data, or some combination thereof. The source characteristics data may include an order issue rate for a given source associated with the online system 140.

TABLE 1

| Zone Temperature | Spoilage Prediction Score | Example Rules |
|---|---|---|
| Cold (0-49) | 0-0.24 | No action |
| | 0.25-0.49 | No action |
| | 0.50-0.74 | Do not multi-batch |
| | 0.75-1.0 | Do not multi-batch/Ensure tenured picker |

TABLE 1-continued

| Zone Temperature | Spoilage Prediction Score | Example Rules |
|---|---|---|
| Moderate | 0-0.24 | No action |
| (50-79) | 0.25-0.49 | No action |
| | 0.50-0.74 | Do not multi-batch |
| | 0.75-1.0 | Do not multi-batch/Ensure tenured picker |
| Hot | 0-0.24 | No action |
| (80-99) | 0.25-0.49 | Ensure cooler bag compliant picker |
| | 0.50-0.74 | Do not multi-batch/Ensure tenured picker/Ensure cooler bag compliant picker |
| | 0.75-1.0 | Do not multi-batch/Ensure tenured picker/Ensure cooler bag compliant picker/No unattended delivery |
| Extreme | 0-0.24 | No action |
| Heat | 0.25-0.49 | Do not multi-batch/Ensure tenured picker/Ensure cooler bag compliant picker |
| (100+) | 0.50-0.74 | Do not multi-batch/Ensure tenured picker/Ensure cooler bag compliant picker/No unattended delivery |
| | 0.75-1.0 | Do not multi-batch/Ensure tenured picker/Ensure cooler bag compliant picker/No unattended delivery/Send user warning |

The implementation of the TSP machine-learning model at the online system 140 offers numerous advantages, including reducing financial liabilities connected to spoilage-related refunds, enhancing user experience by ensuring the integrity of perishable items, and laying the groundwork for scalable improvements in other logistical domains. Additionally, the TSP machine-learning model is designed to be adaptable, capable of retraining in response to changing patterns and trends, thereby maintaining its efficacy over time.

Critically, deploying such predictive capabilities positions the online system 140 advantageously within the competitive landscape of e-commerce, potentially outperforming competitors who have not yet integrated such advanced analytics for spoilage reduction. This prognostic machine-learning model serves as a strategic enhancement, fostering reliable service delivery and potentially bolstering market leadership in the online grocery sector.

Figure 5:
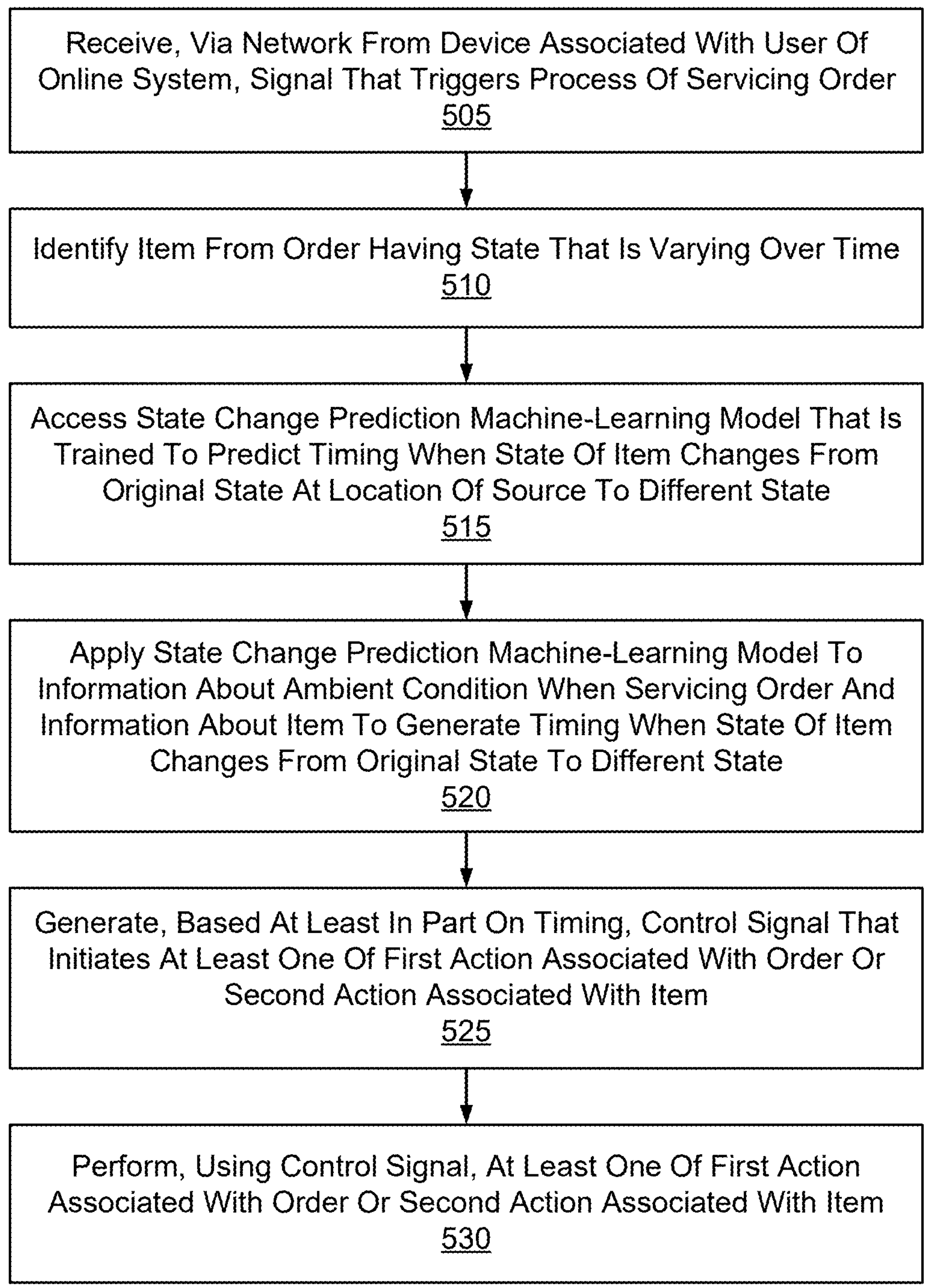
FIG. 5 is a flowchart for a method of using a trained machine-learning model of an online system to predict timing of a state change of a perishable item in an order, in accordance with one or more embodiments.

FIG. 5 is a flowchart for a method of using a trained machine-learning model of an online system to predict timing of a state change of a perishable item in an order, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., at the order management module 220), via a network (e.g., the network 130) from a device associated with a user of the online system 140 (e.g., the user client device 100), a signal that triggers a process of servicing an order. The online system 140 identifies 510 (e.g., via the order management module 220) an item (e.g., perishable item) from the order having a state that is varying over time.

The online system 140 accesses 515 a state change prediction machine-learning model of the online system 140 (e.g., via the state change prediction module 250), wherein the state change prediction machine-learning model is trained to predict a timing (e.g., timestamp) when a state of the item changes from an original state at a location of a source associated with the online system 140 to a different state. The online system 140 applies 520 the state change prediction machine-learning model (e.g., via the state change prediction module 250) to information about an ambient condition when servicing the order and information about the item to generate the timing when the state of the item changes from the original state to the different state.

The online system 140 generates 525 (e.g., via the order management module 220), based at least in part on the timing, a control signal that initiates at least one of a first action associated with the order or a second action associated with the item. The online system 140 performs 530 (e.g., via the order management module 220), using the control signal, at least one of the first action associated with the order or the second action associated with the item.

The online system 140 may receive (e.g., at the order management module 220), from a device of an agent servicing the order (e.g., the picker client device 110) and via the network, the information about the ambient condition including an ambient temperature. The online system 140 may further retrieve (e.g., via the order management module 220), from a database of the online system 140 (e.g., the data store 240), the information about the item including a set of temperature features (e.g., temperature constraints) for the item.

The online system 140 may further receive (e.g., at the order management module 220), from the device of the agent and via the network, information about the agent including one or more images of a cooling device in a vehicle of the agent that will be used for servicing the order. The online system 140 may apply (e.g., via the state change prediction module 250) the state change prediction machine-learning model further to the information about the agent to generate the timing when the state of the item changes from the original state to the different state.

The online system 140 may further receive (e.g., at the order management module 220), from the device associated with the user and via the network, information about the user including information about a current location of the user. The online system 140 may apply (e.g., via the state change prediction module 250) the state change prediction machine-learning model further to the information about the user to generate the timing when the state of the item changes from the original state to the different state.

In one or more embodiments, the control signal includes a user interface signal. In such cases, the online system 140 may send the user interface signal to at least one of the device associated with the agent or the device associated with the user, wherein the sending causes at least one of the device associated with the agent to display a first user interface or the device associated with the user to display a second user interface with an indication of at least one of the first action or the second action.

In one or more embodiments, the online system 140 performs the first action associated with the order by determining (e.g., via the servicing adjustment module 225), based at least in part on the timing, a schedule for servicing the order. In such cases, the online system 140 may send (e.g., via the user interface module 227) the control signal including a user interface signal to the device associated with the agent, wherein the sending causes the device associated with the agent to display a user interface with an indication of the first action including the information about the schedule for servicing the order.

In one or more other embodiments, the online system 140 performs the first action associated with the order by splitting (e.g., via the servicing adjustment module 225), based at least in part on the timing, servicing of the order into servicing a first part of the order including the item during a first time period and servicing a second part of the order without the item during a second time period that is later than the first time period. In such cases, the online system 140 may send (e.g., via the user interface module 227) the control signal including a user interface signal the user interface signal to the device associated with the agent, wherein the sending causes the device associated with the agent to display a user interface with an indication of the first action including information about servicing the first part of the order during the first time period and servicing the second part of the order during the second time period.

In one or more other embodiments, the online system 140 performs the second action associated with the item by cancelling (e.g., via the item removal module 223), based at least in part on the timing, the item from the order. In such cases, the online system 140 may generate (e.g., via the item removal module 223), using the control signal, an appeasement (e.g., refund) for the item. After that, the online system 140 may send (e.g., via the user interface module 227) the control signal including a user interface signal to the device associated with the user, wherein the sending causes the device associated with the user to display a user interface with an indication of the second action including information about cancelling the item from the order and a notification about the appeasement for the item.

In one or more other embodiments, the online system 140 performs the first action associated with the order by eliminating (e.g., via the servicing adjustment module 225), from a set of time periods for servicing the order and based at least in part on the timing, one or more time periods. In such cases, the online system 140 may send (e.g., via the user interface module 227) the control signal including a user interface signal to the device associated with the user, wherein the sending causes the device associated with the user to display a user interface with an indication of the first action including information about the set of time periods for servicing the order without the one or more time periods.

In one or more other embodiments, the online system 140 determines (e.g., via the user interface module 227), based at least in part on the timing and the information about the ambient condition when servicing the order, a first placement in a user interface of the device associated with the user for a first set of items having stable states over time and a second placement in the user interface for a second set of items having varying states over time, the second placement lower than the first placement. In such cases, the online system 140 may send (e.g., via the user interface module 227) the control signal including a user interface signal to the device associated with the user, wherein the sending causes the device associated with the user to display the user interface with the first set of items at the first placement and the second set of items at the second placement.

The online system 140 may access an item removal machine-learning model of the online system 140 (e.g., via the item removal module 223), wherein the item removal machine-learning model is trained to identify whether the item should be removed from the order. The online system 140 may apply the item removal machine-learning model (e.g., via the item removal module 223) to at least one of first feedback information about the item provided by a plurality of users of the online system 140, one or more features of the agent, the information about the ambient condition, or second feedback information about the item provided by the user to generate a removal score for the item that is indicative of whether the item should be removed from the order. The online system 140 may cancel (e.g., via the item removal module 223), based on the removal score, the item from the order. The online system 140 may further generate (e.g., via the item removal module 223), using the control signal, an appeasement (e.g., refund) for the item. After that, the online system 140 may send (e.g., via the user interface module 227) the control signal including a user interface signal to the device associated with the user, wherein the sending causes the device associated with the user to display a user interface with an indication of the second action including information about cancelling the item from the order and the notification about the appeasement for the item.

The online system 140 may generate (e.g., via the machine-learning training module 230) training data including labels collected in lab settings about changes of states of a plurality of items over time at a plurality of ambient temperatures. The online system 140 may train (e.g., via the machine-learning training module 230), using the training data, the state change prediction machine-learning model to generate a set of initial values for a set of parameters of the state change prediction machine-learning model.

The online system 140 may receive (e.g., via the machine-learning training module 230), from the device associated with the user and via the network, feedback data with information about a score provided by the user via the second user interface about the state of the item at a location of the user. The online system 140 may re-train the state change prediction machine-learning model by updating (e.g., via the machine-learning training module 230), using the feedback data, the set of parameters of the state change prediction machine-learning model.

Embodiments of the present disclosure are directed to the online system 140 that utilizes a trained machine-learning model to predict timing of a state change of a perishable item and generate a user interface that displays servicing modifications for an online order caused by the perishable item. By implementing the trained machine-learning model presented herein, the online system 140 improves the omnichannel and fulfilment experience for adverse conditions.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network from a device associated with a user of an online system, a signal that triggers a process of servicing an order;

identifying an item from the order having a state that is varying over time;

accessing a state change prediction machine-learning model of the online system, wherein the state change prediction machine-learning model is trained to predict a timing when a state of the item changes from an original state at a location of a source associated with the online system to a different state;

applying the state change prediction machine-learning model to information about an ambient condition when servicing the order and information about the item to generate the timing when the state of the item changes from the original state to the different state;

generating, based at least in part on the timing, a control signal that initiates at least one of a first action associated with the order or a second action associated with the item; and performing, using the control signal, at least one of the first action associated with the order or the second action associated with the item.

2. The method of claim 1, further comprising:

receiving, from a device of an agent of the online system servicing the order and via the network, the information about the ambient condition including an ambient temperature; and retrieving, from a database of the online system, the information about the item including a set of temperature features for the item.

3. The method of claim 1, further comprising:

receiving, from a device of an agent of the online system servicing the order and via the network, information about the agent including one or more images of a cooling device in a vehicle of the agent that will be used for servicing the order, wherein applying the state change prediction machine-learning model comprises applying the state change prediction machine-learning model further to the information about the agent to generate the timing when the state of the item changes from the original state to the different state.

4. The method of claim 1, further comprising:

receiving, from the device associated with the user and via the network, information about the user including information about a current location of the user, wherein applying the state change prediction machine-learning model comprises applying the state change prediction machine-learning model further to the information about the user to generate the timing when the state of the item changes from the original state to the different state.

5. The method of claim 1, wherein the control signal includes a user interface signal, and the method further comprising:

sending the user interface signal to at least one of a device associated with an agent of the online system servicing the order or the device associated with the user, wherein the sending causes at least one of the device associated with the agent to display a first user interface or the device associated with the user to display a second user interface with an indication of at least one of the first action or the second action.

6. The method of claim 1, wherein performing the first action comprises:

determining, based at least in part on the timing, a schedule for servicing the order; and sending, via the network, the control signal including a user interface signal to a device associated with an agent of the online system servicing the order, wherein the sending causes the device associated with the agent to display a user interface with an indication of the first action including information about the schedule for servicing the order.

7. The method of claim 1, wherein performing the first action comprises:

splitting, based at least in part on the timing, servicing of the order into servicing a first part of the order including the item during a first time period and servicing a second part of the order without the item during a second time period that is later than the first time period; and sending, via the network, the control signal including a user interface signal to a device associated with an agent of the online system servicing the order, wherein the sending causes the device associated with the agent to display a user interface with an indication of the first action including information about servicing the first part of the order during the first time period and servicing the second part of the order during the second time period.

8. The method of claim 1, wherein performing the second action comprises:

cancelling, based at least in part on the timing, the item from the order;

generating, using the control signal, an appeasement for the item; and sending, via the network, the control signal including a user interface signal to the device associated with the user, wherein the sending causes the device associated with the user to display a user interface with an indication of the second action including information about cancelling the item from the order and a notification about the appeasement for the item.

9. The method of claim 1, wherein performing the first action comprises:

eliminating, from a set of time periods for servicing the order and based at least in part on the timing, one or more time periods; and sending, via the network, the control signal including a user interface signal to the device associated with the user, wherein the sending causes the device associated with the user to display a user interface with an indication of the first action including information about the set of time periods for servicing the order without the one or more time periods.

10. The method of claim 1, further comprising:

determining, based at least in part on the timing and the information about the ambient condition when servicing the order, a first placement in a user interface of the device associated with the user for a first set of items having stable states over time and a second placement in the user interface for a second set of items having varying states over time, the second placement lower than the first placement; and sending, via the network, the control signal including a user interface signal to the device associated with the user, wherein the sending causes the device associated with the user to display the user interface with the first set of items at the first placement and the second set of items at the second placement.

11. The method of claim 1, wherein performing the second action comprises:

accessing an item removal machine-learning model of the online system, wherein the item removal machine-learning model is trained to identify whether the item should be removed from the order;

applying the item removal machine-learning model to at least one of first feedback information about the item provided by a plurality of users of the online system, one or more features of an agent of the online system servicing the order, the information about the ambient condition, or second feedback information about the item provided by the user to generate a removal score for the item that is indicative of whether the item should be removed from the order;

cancelling, based on the removal score, the item from the order;

generating, using the control signal, an appeasement for the item; and sending, via the network, the control signal including a user interface signal to the device associated with the user, wherein the sending causes the device associated with the user to display a user interface with an indication of the second action including information about cancelling the item from the order and a notification about the appeasement for the item.

12. The method of claim 1, further comprising:

generating training data including labels collected in lab settings about changes of states of a plurality of items over time at a plurality of ambient temperatures; and training, using the training data, the state change prediction machine-learning model to generate a set of initial values for a set of parameters of the state change prediction machine-learning model.

13. The method of claim 1, further comprising:

receiving, from the device associated with the user and via the network, feedback data with information about a score provided by the user via a user interface of the device associated with the user about the state of the item at a location of the user; and re-training the state change prediction machine-learning model by updating, using the feedback data, a set of parameters of the state change prediction machine-learning model.

14. A computer program product comprising a non-transitory computer readable storage medium having instructions encoded thereon that, when executed by a processor, cause the processor to perform steps comprising:

receiving, via a network from a device associated with a user of an online system, a signal that triggers a process of servicing an order;

identifying an item from the order having a state that is varying over time;

accessing a state change prediction machine-learning model of the online system, wherein the state change prediction machine-learning model is trained to predict a timing when a state of the item changes from an original state at a location of a source associated with the online system to a different state;

applying the state change prediction machine-learning model to information about an ambient condition when servicing the order and information about the item to generate the timing when the state of the item changes from the original state to the different state;

generating, based at least in part on the timing, a control signal that initiates at least one of a first action associated with the order or a second action associated with the item; and performing, using the control signal, at least one of the first action associated with the order or the second action associated with the item.

15. The computer program product of claim 14, wherein the instructions further cause the processor to perform steps comprising:

receiving, from a device of an agent of the online system servicing the order and via the network, the information about the ambient condition including an ambient temperature; and retrieving, from a database of the online system, the information about the item including a set of temperature features for the item.

16. The computer program product of claim 14, wherein the instructions further cause the processor to perform steps comprising:

determining, based at least in part on the timing, a schedule for servicing the order; and sending, via the network, the control signal including a user interface signal to a device associated with an agent of the online system servicing the order, wherein the sending causes the device associated with the agent to display a user interface with an indication of the first action including information about the schedule for servicing the order.

17. The computer program product of claim 14, wherein the instructions further cause the processor to perform steps comprising:

splitting, based at least in part on the timing, servicing of the order into servicing a first part of the order including the item during a first time period and servicing a second part of the order without the item during a second time period that is later than the first time period; and sending, via the network, the control signal including a user interface signal to a device associated with an agent of the online system servicing the order, wherein the sending causes the device associated with the agent to display a user interface with an indication of the first action including information about servicing the first part of the order during the first time period and servicing the second part of the order during the second time period.

18. The computer program product of claim 14, wherein the instructions further cause the processor to perform steps comprising:

determining, based at least in part on the timing and the information about the ambient condition when servicing the order, a first placement in a user interface of the device associated with the user for a first set of items having stable states over time and a second placement in the user interface for a second set of items having varying states over time, the second placement lower than the first placement; and sending, via the network, the control signal including a user interface signal to the device associated with the user, wherein the sending causes the device associated with the user to display the user interface with the first set of items at the first placement and the second set of items at the second placement.

19. The computer program product of claim 14, wherein the instructions further cause the processor to perform steps comprising:

accessing an item removal machine-learning model of the online system, wherein the item removal machine-learning model is trained to identify whether the item should be removed from the order;

applying the item removal machine-learning model to at least one of first feedback information about the item provided by a plurality of users of the online system, one or more features of an agent of the online system servicing the order, the information about the ambient condition, or second feedback information about the item provided by the user to generate a removal score for the item that is indicative of whether the item should be removed from the order;

cancelling, based on the removal score, the item from the order;

generating, using the control signal, an appeasement for the item; and sending, via the network, the control signal including a user interface signal to the device associated with the user, wherein the sending causes the device associated with the user to display a user interface with an indication of the second action including information about cancelling the item from the order and a notification about the appeasement for the item.

20. A computer system comprising:

a processor; and a non-transitory computer-readable storage medium having instructions that, when executed by the processor, cause the computer system to perform steps comprising:

receiving, via a network from a device associated with a user of an online system, a signal that triggers a process of servicing an order;

identifying an item from the order having a state that is varying over time;

accessing a state change prediction machine-learning model of the online system, wherein the state change prediction machine-learning model is trained to predict a timing when a state of the item changes from an original state at a location of a source associated with the online system to a different state;

applying the state change prediction machine-learning model to information about an ambient condition when servicing the order and information about the item to generate the timing when the state of the item changes from the original state to the different state;

generating, based at least in part on the timing, a control signal that initiates at least one of a first action associated with the order or a second action associated with the item; and performing, using the control signal, at least one of the first action associated with the order or the second action associated with the item.

* * * * *